United States Patent
Kuribayashi et al.

(10) Patent No.: US 9,278,626 B2
(45) Date of Patent: Mar. 8, 2016

(54) CHARGING CONTROL SYSTEM, CHARGING CONTROL METHOD, AND PROGRAM

(75) Inventors: Ryosuke Kuribayashi, Tokyo (JP); Hitoshi Yano, Tokyo (JP); Koji Kudo, Tokyo (JP); Kazuhiko Ogimoto, Tokyo (JP); Kazuto Kataoka, Tokyo (JP); Takashi Ikegami, Tokyo (JP)

(73) Assignees: NEC Corporation, Tokyo (JP); The University of Tokyo, Tokyo (JP)

( * ) Notice: Subject to any disclaimer, the term of this patent is extended or adjusted under 35 U.S.C. 154(b) by 252 days.

(21) Appl. No.: 14/002,338

(22) PCT Filed: Feb. 13, 2012

(86) PCT No.: PCT/JP2012/053264
§ 371 (c)(1),
(2), (4) Date: Aug. 29, 2013

(87) PCT Pub. No.: WO2012/120977
PCT Pub. Date: Sep. 13, 2012

(65) Prior Publication Data
US 2013/0335025 A1    Dec. 19, 2013

(30) Foreign Application Priority Data
Mar. 4, 2011   (JP) .................................. 2011-047762

(51) Int. Cl.
*H02J 7/00* (2006.01)
*B60L 11/18* (2006.01)
(Continued)

(52) U.S. Cl.
CPC ......... B60L 11/1848 (2013.01); B60L 11/1842 (2013.01); B60L 11/1844 (2013.01); H01M 10/4207 (2013.01); *B60L 2230/22* (2013.01);
(Continued)

(58) Field of Classification Search
USPC .......................... 320/107, 109, 132, 137, 104
See application file for complete search history.

(56) References Cited

U.S. PATENT DOCUMENTS

| | | | |
|---|---|---|---|
| 5,467,006 A | 11/1995 | Sims | |
| 2008/0162059 A1* | 7/2008 | Murakami | ...................... 702/63 |
| 2008/0203973 A1 | 8/2008 | Gale et al. | |
| 2010/0179704 A1 | 7/2010 | Ozog | |

FOREIGN PATENT DOCUMENTS

| | | |
|---|---|---|
| JP | 2000-209707 A | 7/2000 |
| JP | 2008-067418 A | 3/2008 |
| JP | 2009-022061 A | 1/2009 |

OTHER PUBLICATIONS

International Search Report (ISR) (PCT Form PCT/ISA/210), in PCT/JP2012/053264, dated May 15, 2012.
(Continued)

*Primary Examiner* — Brian Ngo
(74) *Attorney, Agent, or Firm* — McGinn IP Law Group, PLLC (57) ABSTRACT

A charging control system includes a flattened charging speed calculation unit that calculates a flattened charge speed for fully charging EVs at a constant speed according to permitted charging time for the EVs and the amount of charging required by the EVs; a charging speed calculation unit that calculates a charging speed for the EVs by multiplying the flattened charging speed by a request demand ratio function based on change over time in electric power demand requested from the electric power supply side; and a control unit that controls the charging of the EVs on the basis of the charging speed calculated by the charging speed calculation unit.

2 Claims, 6 Drawing Sheets (51) Int. Cl.
*H01M 10/42* (2006.01)
*H01M 10/48* (2006.01)

(52) U.S. Cl.
CPC .......... *B60L 2230/24* (2013.01); *B60L 2230/40* (2013.01); *B60L 2240/549* (2013.01); *B60L 2240/70* (2013.01); *B60L 2240/80* (2013.01); *B60L 2260/58* (2013.01); *H01M 10/482* (2013.01); *H01M 2010/4278* (2013.01); *H01M 2220/20* (2013.01); *Y02E 60/721* (2013.01); *Y02T 10/7005* (2013.01); *Y02T 90/121* (2013.01); *Y02T 90/128* (2013.01); *Y02T 90/14* (2013.01); *Y02T 90/163* (2013.01); *Y04S 10/126* (2013.01)

(56) References Cited

OTHER PUBLICATIONS

Demand Response —sono 1, Intertech Research Blog, [online], Nov. 17, 2010, [retrieval date Apr. 24, 2012], Internet, <URL:http://www.itrco.jp/wordpress/?p=2083>.

G.K. Venayagamoorthy et al., "Real-Time Modeling of Distributed Plug-in Vehicles for V2G Transactions," Energy Conversion Congress and Exposition, 2009. ECCE 2009. IEEE, 3937-3941 (2009).

Extended European Search Report dated Sep. 24, 2015.

\* cited by examiner

CHARGING CONTROL SYSTEM, CHARGING CONTROL METHOD, AND PROGRAM

TECHNICAL FIELD

The present invention relates to a charging control system, a charging control method, and a program for vehicles that run on electric power, including hybrid electric vehicles that are equipped with another source of motive force.

BACKGROUND ART

As environmental problems become increasingly serious in recent years, renewable power sources such as solar cells and wind power generators that are rapidly being put into use are considered to be an effective means of achieving lower carbon emissions and solving the problem of energy resources. However, these types of renewable power sources experience large fluctuations in output. As a result, from the standpoint of the quality of electric power, an adjustment means is indispensable for offsetting the fluctuations in output of the renewable power sources. Thermal power generators, which feature rapid response speed, are currently the chief means used as such adjustment means. As a result, the increased introduction of renewable power sources that have major fluctuation in output may be caught in a dilemma in which thermal power generators need to be used as adjustment means. Obtaining a powerful adjustment means to take the place of thermal power generators is therefore a major issue. As one such adjustment means, the introduction of high-capacity storage batteries (such as sodium sulfur batteries) is effective, but from the standpoint of installation and operating costs, the introduction of high-capacity storage batteries is thought to face extremely high obstacles.

Great strides are being made in research relating to V2G (Vehicle-to-Grid) technology that, by effecting multiple linkage and operation, employs as virtual high-capacity storage batteries for electric power system stabilization: the storage batteries that are mounted in vehicles that run on electric power (hereinbelow referred to as EV (Electric Vehicles) that include hybrid electric vehicles that are equipped with storage batteries together with another motive power source) and that, similar to renewable power sources, are expected to rapidly come into widespread use; and the chargers to which these storage batteries are connected. The V2G proposal itself dates to the 1980s, and research reports estimating the extent of the macro-stabilization effect over an entire electric power system network have been issued continuously. In the past few years, the reports have come to focus on micro-control methods for the concrete construction of a system, i.e., technology for controlling the charging of a multiplicity of EVs individually and in real time.

For example, Non-Patent Document 1 describes a charging/discharging control method for setting, for example, an EV driving model, a power distribution network model, and an electric power price time variation model and implementing optimum scheduling by Particle Swarm Optimization (PSO), which is inspired by the movement of shoal of fishes.

Patent Document 1 describes the configuration of an EV charging planning device and refers to optimum charging scheduling that uses a genetic algorithm.

A case that assumes not only the charging of EVs but also the discharging from the EVs to the distribution network (electric power system side) is typically referred to as V2G. However, a case that assumes only charging of EVs may be referred to distinguish from G2V. G2V is assumed to decrease the load upon the internal storage battery of EVs in proportion to the decrease in the number of charge/discharge cycles.

LITERATURE OF THE PRIOR ART

Patent Documents

Patent Document 1: Japanese Patent Application Publication No. 2000-209707

Non-Patent Documents

Non-Patent Document 1: G. K. Venayagamoorthy et al., "Real-Time Modeling of Distributed Plug-in Vehicles for V2G Transactions," Energy Conversion Congress and Exposition, 2009. ECCE 2009. IEEE, 3937-3941 (2009).

SUMMARY OF THE INVENTION

Problem to be Solved by the Invention

At the current state, however, there are virtually no reports relating to a system that has been put into practical use in which comprehensive investigation has been conducted regarding, for example, the mitigation of risk or burden placed on EV owners (insufficient charging at the time of departure or the accelerated deterioration of EV internal storage batteries), real-time response, and reduction of the calculated processing load for optimized scheduling, and this lack is a serious problem for promoting the practical application of an EV charging control system.

It is an object of the present invention to provide a charging control system, a charging control method, and a program that, taking into consideration the above-described problems of the art, can facilitate the practical application of a multiple-EV linked charging system that can serve as an electric power adjustment means that can cope with, for example, the fluctuation in output of a renewable power source.

Means for Solving the Problem

The present invention for achieving the above-described object is characterized by a charging control system that controls charging to vehicles that run on electric power, including: a flattened charging speed calculation unit that calculates a flattened charging speed for fully charging the vehicles at a fixed speed according to a permitted charging time for the vehicles and an amount of charging that is required by the vehicles; a charging speed calculation unit that calculates the charging speed for the vehicles by multiplying a request demand ratio function that is based on the change over time of electric power demand requested from the electric power supply side and the flattened charging speed together; and a control unit that controls charging of the vehicles based on the charging speed that was calculated in the charging speed calculation unit.

The charging control method of the present invention is a charging control method that controls the charging of vehicles that run on electric power and includes processes of: calculating the flattened charging speed for fully charging the vehicles at a fixed speed according to the permitted charging time for the vehicles and the amount of charging that is required by the vehicles;

calculating the charging speed for the vehicles by multiplying a request demand ratio function that is based on the change over time of the electric power demand requested from the electric power supply side and the flattened charging speed together; and controlling charging of the vehicles based on the charging speed that was calculated.

The program of the present invention causes a computer for controlling charging of vehicles that run on electric power to execute procedures of:

calculating the flattened charging speed for fully charging the vehicles at a fixed speed according to the permitted charging time for the vehicles and the amount of charging that is required by the vehicles;

calculating the charging speed for the vehicles by multiplying a request demand ratio function that is based on the change over time of the electric power demand requested from the electric power supply side and the flattened charging speed together; and controlling charging of the vehicles based on the charging speed that was calculated.

Effect of the Invention

Due the configuration described hereinabove, the present invention can execute full charging of vehicles within a permitted charging time while coping with changes over time of the electric power demand that is requested from the electric power supply side and can therefore facilitate the practical application of a multiple-EV linked charging system that can serve as an electric power adjustment means that can deal with, for example, fluctuation in the output of a renewable power source.

BRIEF DESCRIPTION OF THE DRAWINGS

FIG. 1b shows the configuration of an electric power aggregator shown in FIG. 1a.

BEST MODE FOR CARRYING OUT THE INVENTION

An exemplary embodiment of the present invention is next described with reference to the accompanying drawings.

Figure 1A:
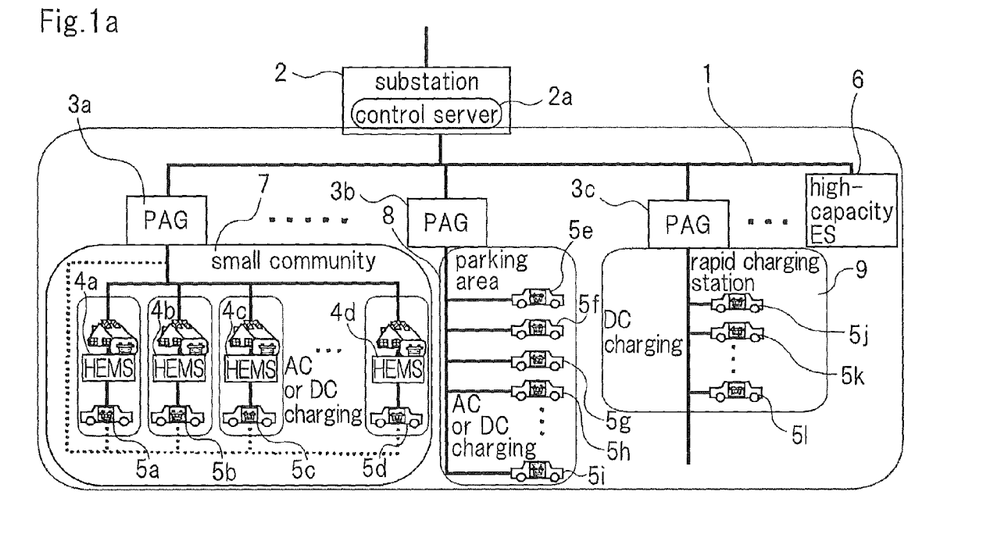
FIG. 1a shows the overall configuration of an example of the charging environment of electric vehicles in which the charging control system of the present invention has been adopted.

FIG. 1a shows the overall configuration of an example of a charging environment of electric vehicles in which the charging control system of the present invention has been adopted. In addition, FIG. 1b shows the configuration of a power aggregator shown in FIG. 1a.

As shown in FIG. 1a, the present example is capable of charging electric vehicles EV 5a-5l in small community 7, in parking area 8 and at rapid charging station 9, and is provided with electric power aggregators 3a-3c that correspond to each of small community 7, parking area 8 and rapid charging station 9. These electric power aggregators 3a-3c are connected to substation 2 by way of electric power distribution line network and information communication network 1, and substation 2 is further provided with electric power control server 2a. In addition, HEMS (Home Energy Management Systems) 4a-4d are provided in small community 7, and high-capacity energy storage 6 is also connected to electric power distribution line network and information communication network 1.

Figure 1B:
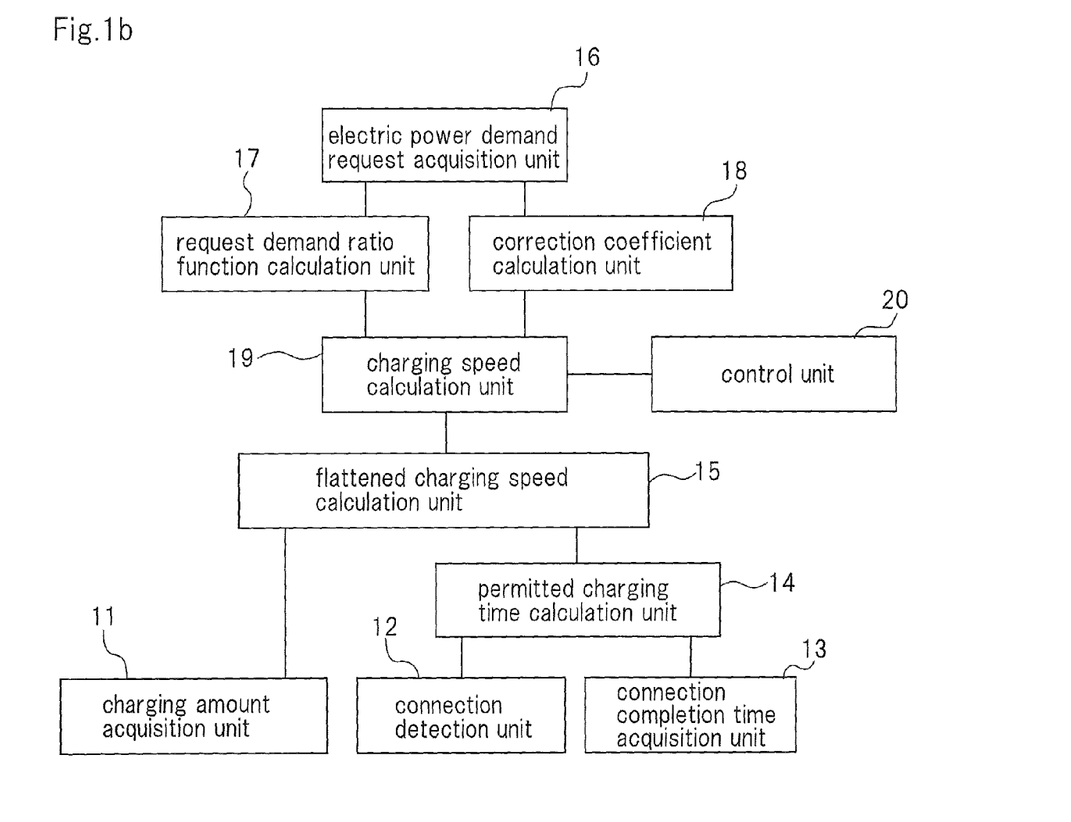

As shown in FIG. 1b, electric power aggregators 3a-3c are each provided with: charging amount acquisition unit 11, connection detection unit 12, connection completion time acquisition unit 13, permitted charging time calculation unit 14, flattened charging speed calculation unit 15, electric power demand request acquisition unit 16, request demand ratio function calculation unit 17, correction coefficient calculation unit 18, charging speed calculation unit 19, and control unit 20. These constituent elements can actually conceivably be realized by a program that is installed in electric power aggregators 3a-3c and that may also be provided in, for example, HEMS 4a-4d.

In the charging control system that is configured as described above, for each of EV 5a-5l, a permitted charging time is calculated simultaneously with the start of connection to a charger (power distribution network) in electric power aggregators 3a-3c, and a flattened charging speed that is a fixed charging speed that fully uses this permitted charging time is calculated (charging speed (electric power demand) flattened scheduling).

In addition, electric power demand requests, which are data that are to be taken as the target of electric power demand control, is acquired from the electric power supply side such as an electric power company that presumably wants to carry out electric power adjustment, and a request demand ratio function that is created based on these electric power demand requests and that represents the form of change over time of mid- to long-term electric power demand, and a real-time correction coefficient that corresponds to sudden electric power demand requests that are caused by, for example, emergencies such as accidents or short-term fluctuations in the output of a renewable power source are multiplied by a flattened charging speed that is calculated by flattened scheduling. In addition, the data that are to be the target of electric power demand control are time-sequence data that reflect, for example, estimates of mid- to long-term output fluctuation of a renewable power source in addition to typical electric power demand estimates, an example that can be offered being electric power prices that fluctuate over time.

In this way, calculating of the charging speed at each point in time for each of EVs 5a-5l, i.e., charging scheduling, is carried out, and control of the storage batteries and charging equipment of EVs 5a-5l is carried out based on this result.

The charging control method in the charging control system that is configured as described above is next described.

Figure 2A:
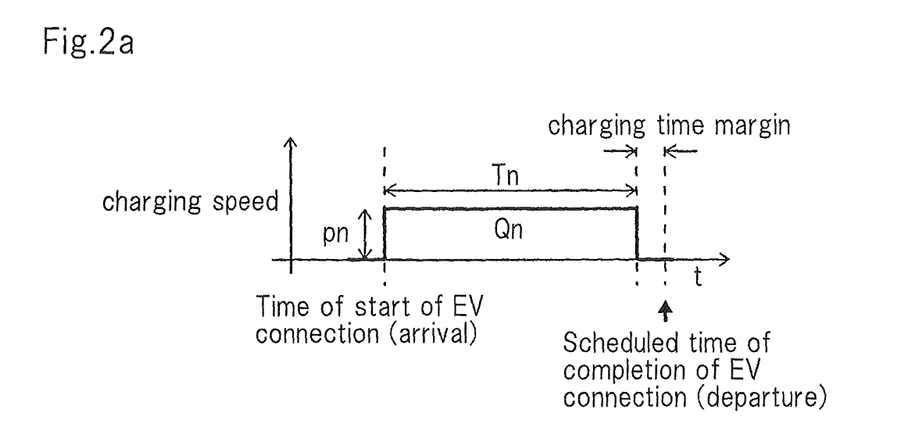
FIG. 2a is a view for describing the basic concept of the charging control method in the charging control system shown in FIG. 1.
Figure 2B:
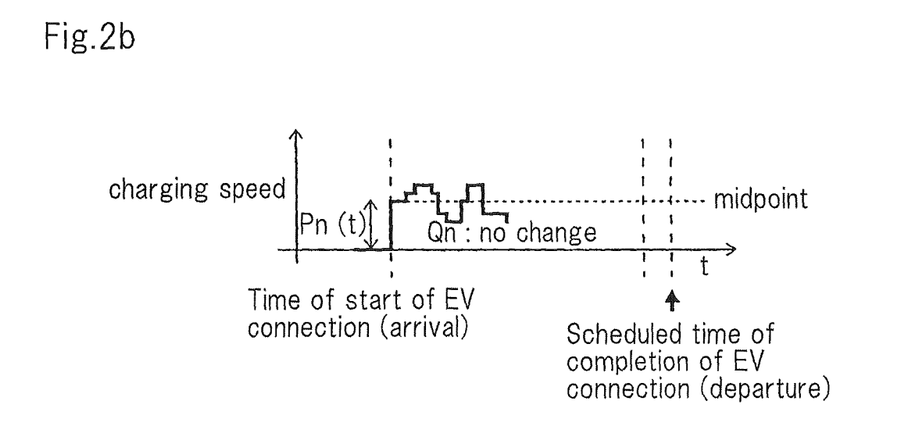
FIG. 2b is a view for describing the basic concept of the charging control method in the charging control system shown in FIG. 1.

FIGS. 2a and 2b are views for describing the general outline of the charging control method in the charging control system shown in FIG. 1.

First, when EVs 5a-5l connect to chargers (power distribution network) in, for example, parking area 8, connection detection unit 12 detects these connections, connection completion time acquisition unit 13 acquires the scheduled times of connection completion (departures), and permitted charging times Tn are then calculated based on these time points and the desired charging time margin in permitted charging time calculation unit 14.

The amount of charging Qn that is necessary for full charging of EVs 5a-5l is acquired in charging amount acquisition unit 11, and in flattened charging speed calculation unit 15, the amount of charging Qn is divided by permitted charging time Tn to calculate flattened charging speed pn that is a fixed charging speed for fully using permitted charging time Tn as shown in FIG. 2a. Here, "n" indicates the ID number of each of EVs 5a-5l.

The electric power demand requests such as described above are acquired from the electric power supply side such as the electric power company that presumably wishes to carry out electric power adjustment in electric power demand request acquisition unit 16, and a request demand ratio function Fn(t) that represents the form of change over time of the mid- to long-term electric power demand is calculated based on these electric power demand requests in request demand ratio function calculation unit 17. In addition, sudden electric power demand requests that are caused by, for example, emergencies such as accidents or short-term fluctuations in the output of a renewable power source are acquired in electric power demand request acquisition unit 16, and real-time correction coefficient C(t) that corresponds to these sudden electric power demand requests is calculated in correction coefficient calculation unit 18.

In charging speed calculation unit 19, the request demand ratio function Fn(t) that was calculated in request demand ratio function calculation unit 17 and the real-time correction coefficient C(t) that was calculated in correction coefficient calculation unit 18 are multiplied by the flattened charging speed pn that was calculated in flattened charging speed calculation unit 15 to calculate the charging speed by which charging is actually carried out in EVs 5a-5l as shown in FIG. 2b. This request demand ratio function Fn(t) is normalized in request demand ratio function calculation unit 17 such that the average value within the permitted charging time for each of EVs 5a-5l is "1." Real-time correction coefficient C(t) that was calculated in correction coefficient calculation unit 18 is a proportional coefficient that is common to EVs 5a-5l. The multiplication of this request demand ratio function Fn(t) corresponds to a "advance scheduling" that is carried out based on requests of from several hours to several days ago, and the multiplication of real-time correction coefficient C(t) corresponds to "real-time response" that is carried out based on the requests that immediately precede charging control. In this case, the storage batteries in each of EVs 5a-5l can be protected by controlling the maximum fluctuation amplitude of the ratio function beforehand such that the maximum permitted charging speed (damage threshold value) that is inherent in each of EVs 5a-5l is not surpassed in each charger.

In addition, although request demand ratio function Fn(t) is normalized, real-time correction coefficient C(t) is not normalized and can take any value, whereby a difference is produced in the total amount of charging Qn by the execution of a real-time response. To circumvent this problem, re-scheduling that includes the calculation of flattened charging speed pn is preferably carried out again immediately following a real-time response. When shortening of the charging time is permitted, re-scheduling can also be carried out only when the charging time surpasses the permitted charging time.

As described hereinabove, it is possible to carry out scheduling of charging speed Pn(t) at each point in time as well as carry out a real-time response while avoiding insufficient charging at the departure time or exceeding the maximum permitted charging speed in each of EVs 5a-5l. The total charging demand at each point in time as seen from the electric power system network (electric power supply) side is the sum total Ptotal(t) of all EVs 5a-5l portions at each time point of this Pn(t). By using the above-described method, the EV charging demand can be handled as an electric power adjustment means and fluctuations in the output of a renewable power source can be absorbed.

Although explanation in the present embodiment has focused on a G2V system that controls only charging of EVs, by extending the embodiment by, for example, permitting a minus sign in the charging speed, the present invention can also be applied to a typical V2G system that includes discharging from EVs.

An actual example of the above-described charging control method is next described with the results of simulation.

Figure 3:
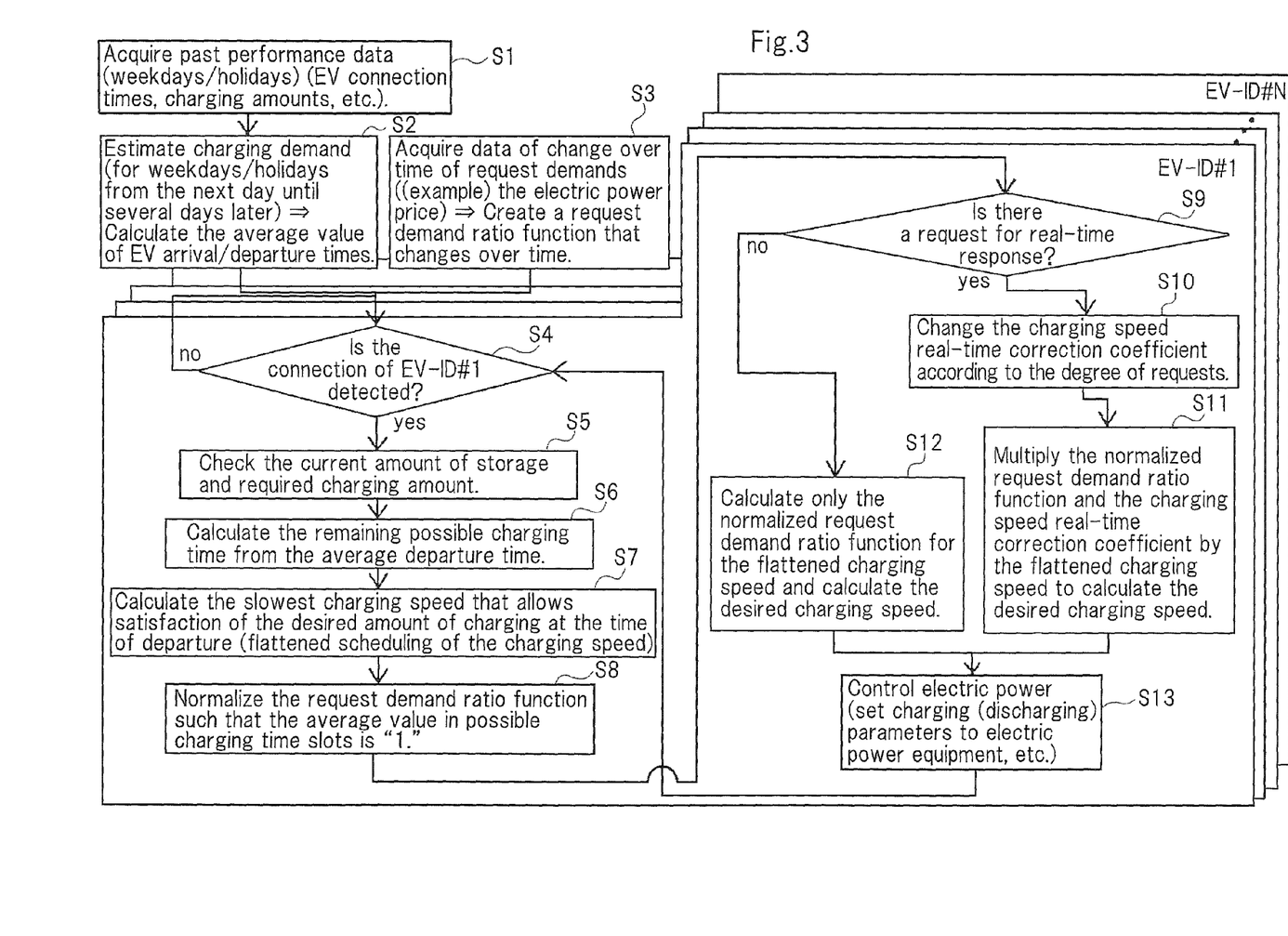
FIG. 3 is a view for describing an actual example of the charging control method in the charging control system shown in FIG. 1.

FIG. 3 is a view for describing an actual example of the charging control method in the charging control system shown in FIG. 1.

Past performance data (both weekdays and holidays) relating to connection times and the amount of charging performed by chargers (power distribution network) of each EV are first acquired (Step 1). Next, based on this data, both the estimation of the charging demand at each time point (for both weekdays and holidays from the next day until several days later) and the calculation of the average value (estimated value) of the times of arrival (charger connections) and departure (charger disconnections) of EVs are implemented (Step 2).

In combination with these processes, the data of the change over time of the requested electric power demand (including electric power prices) that is to be the target of charging demand control are acquired from the electric power supply side in electric power demand request acquisition unit 16. This data is electric power demand requested from the electric power supply side and change over time. Based on this data, request demand ratio function F'(t) that changes over time is calculated in request demand ratio function calculation unit 17 (Step 3). However, at this point, normalization is still not carried out in the permitted charging time of each EV and the function is common to all EVs. No particular limitation applies to the method of calculating this request demand ratio function F'(t), but the function is here calculated as:

request demand ratio function $F'(t)$ before normalization=(maximum electric power price−electric power price)÷(maximum electric power price−minimum electric power price)

Figure 4A:
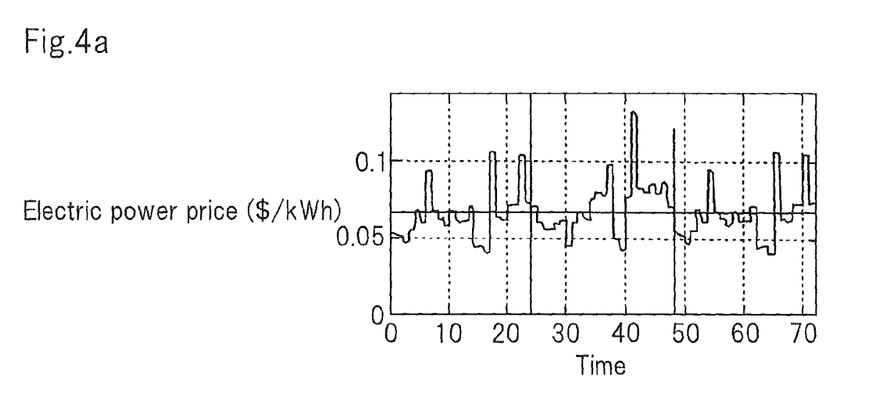
FIG. 4a shows data that are acquired in the electric power demand request acquisition unit shown in FIG. 1.

FIG. 4a shows data that is acquired in electric power demand request acquisition unit 16 shown in FIG. 1. In addition, FIG. 4b shows request demand ratio function F'(t) that is calculated in request demand ratio function calculation unit 17 shown in FIG. 1.

Figure 4B:
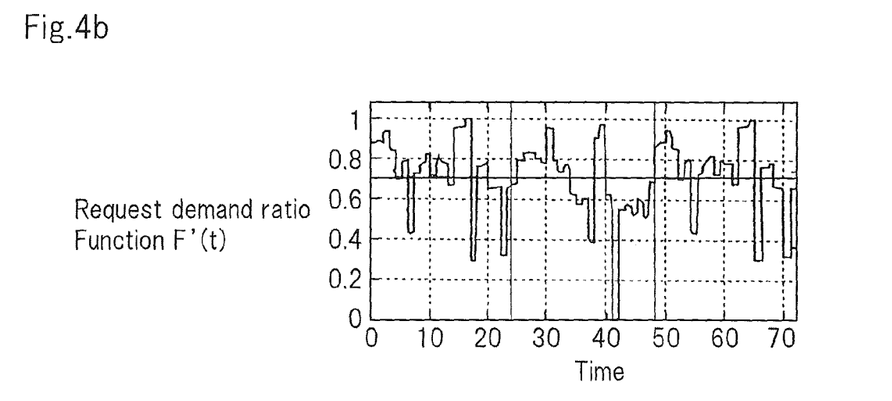
FIG. 4b shows the request demand ratio function F'(t) that is calculated in the request demand ratio function calculation unit shown in FIG. 1.

In request demand ratio function calculation unit 17, a request demand ratio function F'(t) is calculated that changes over time as shown in FIG. 4b according to the electric power price that changes over time as shown in FIG. 4a.

When the connection of EVs to chargers (power distribution network) is detected in connection detection unit 12 (Step 4), information such as the current amount of stored and the amount of charging that is required is acquired for each of these EVs in the amount of charging acquisition unit 11 (Step 5), and further, the scheduled (estimated) departure times are acquired in connection completion time acquisition unit 13, and permitted charging times that are the guaranteed continuous times of connection to chargers (power distribution network) that also take margins into consideration are calculated in permitted charging time calculation unit 14 (Step 6). The simulation shown here assumes 50 EVs that are used in commuting (EV driving in the morning and in the evening).

Figure 5:
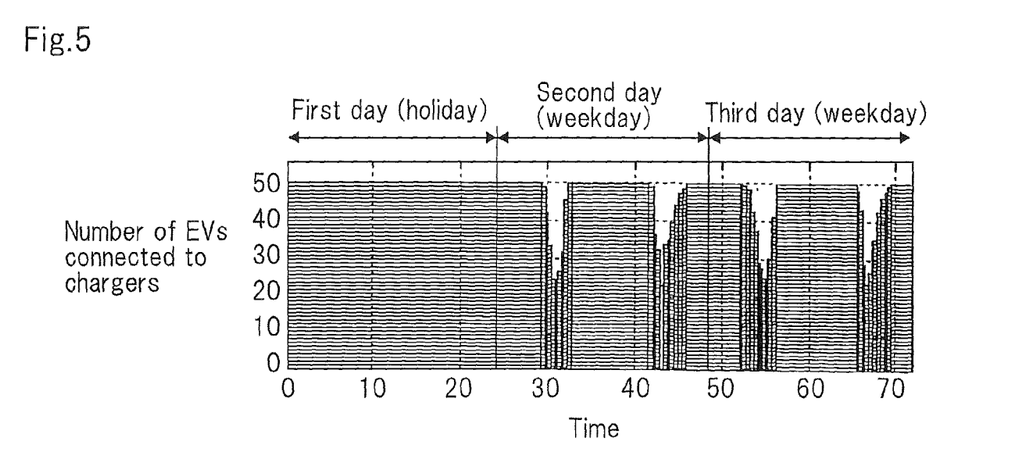
FIG. 5 shows an example of the charger connection pattern for 50 EVs.

FIG. 5 shows an example of the charger connection pattern of the 50 EVs.

The present embodiment is applied to a case in which a connection pattern (a three-day portion of holiday-weekday-weekday) of a random charger (power distribution network) such as shown in FIG. 5 is generated for each EV, on the assumption that all EVs are connected to chargers in time slots in which the EVs are not being driven, i.e., that all EVs are subject to charging control.

Then, in flattened charging speed calculation unit 15, the slowest charging speed at which the desired amount of charging can be satisfied at the time of departure, i.e., flattened charging speed pn, is calculated by dividing the required amount of charging by the permitted charging time for each EV (Step 7).

In addition, in request demand ratio function calculation unit 17, F(t) is normalized such that the average value within the permitted charging time is "1" for each of EVs 5a-5l and request demand ratio function Fn(t) is calculated (Step 8). When there is a sudden request for a change in demand from the electric power supply side immediately before actually carrying out charging control (Step 9), the real-time correction coefficient C(t) of the charging speed is changed to any value from "1" that was set as the initial value according to the degree of this request (Step 10).

Finally, in charging speed calculation unit 15, the normalized request demand ratio function Fn(t) and the real-time correction coefficient C(t) are multiplied by the flattened charging speed pn, and the charging speed Pn(t) at each time point is calculated for each EV (Step 11).

In addition, when there is no sudden request for change in demand from the electric power supply side, the flattened charging speed pn and the normalized request demand ratio function Fn(t) are multiplied and the charging speed Pn(t) at each time point is calculated for each EV in charging speed calculation unit 15 (Step 12).

The charging speed Pn(t) that was calculated is then transmitted to each EV charger and the control of charging equipment, i.e., the electric power demand control, is finally implemented under the control of control unit 20 (Step 13).

Figure 6A:
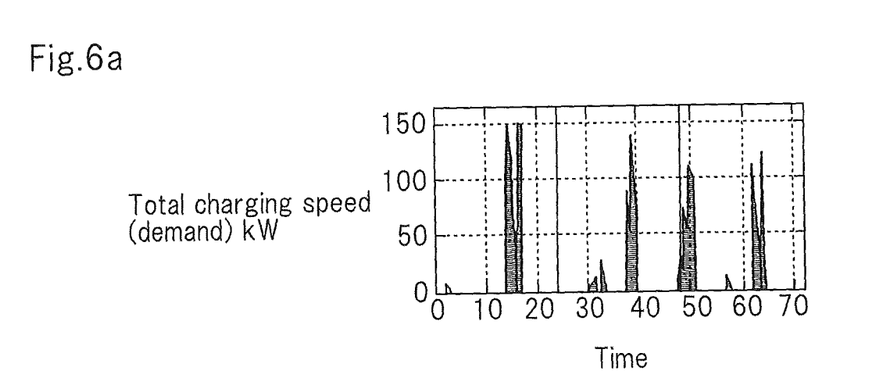
FIG. 6a shows the result of simulating the change in form of total charging demand when assuming 50 EVs.
Figure 6B:
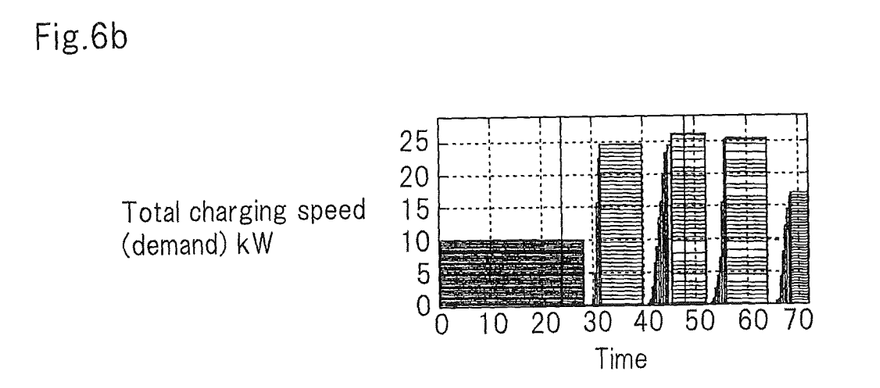
FIG. 6b shows the result of simulating the change in form of total charging demand when assuming 50 EVs.
Figure 6C:
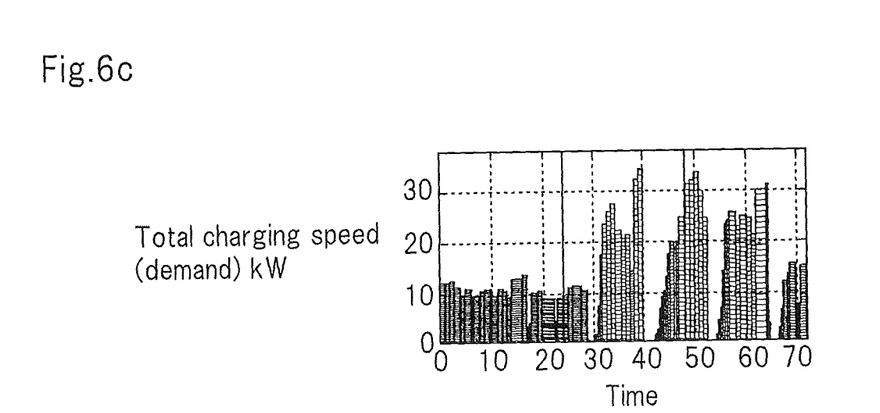
FIG. 6c shows the result of simulating the change in form of total charging demand when assuming 50 EVs.

FIGS. 6a-6c show the results of simulating the change in form of the total charging demand for a case that assumes 50 EVs. In this case, it is assumed that there is no request for a real-time response and that C(t)=1 for all time slots.

When charging scheduling by means of the present embodiment is not carried out, i.e., when each EV owner independently carries out charging scheduling to minimize charging costs based on data of electric power prices that change over time, although the result also depends on the electric power price curve that is the starting point of decision-making, charging demand concentrates at particular times as shown in FIG. 6a, and instead of absorbing, for example, fluctuation in the output of a renewable power source, the potential arises for newly inducing steep and high fluctuations in demand.

When flattened scheduling is carried out by means of the present embodiment, as shown in FIG. 6b, EVs for commuting that are adopted now for use have two driving time slots on weekdays, and the time for charging can therefore be divided into a total of five time slots in three days, whereby not only are steep and high fluctuations in demand obviously controlled, but flattened scheduling for each time slot, i.e., flattening of the electric power demand, is accurately realized.

Still further, when charging scheduling by means of the present embodiment is completed, scheduling is realized in which the form of request demand ratio function F'(t) is accurately reproduced for each time slot as shown in FIG. 6c, whereby the electric power demand control function of a multiple-EV linked charging system which can serve as a power adjustment means for dealing with fluctuation in the output of a renewable power source operates sufficiently.

Despite the apparent increase in the burden of charging costs borne by each of the owners of EVs resulting from the charging control realized by the present exemplary embodiment, in actuality, because it can be assumed that the present exemplary embodiment is used in a business model in which a value equivalent to the contribution to stabilization of the electric power system will be returned from the electric power supply side by way of the operator of the multiple-EV linked charging system, the charging costs borne by each EV owner can be expected to decrease.

A case is next described in which a "real-time response" is added to the simulation shown in FIG. 6.

Figure 7:
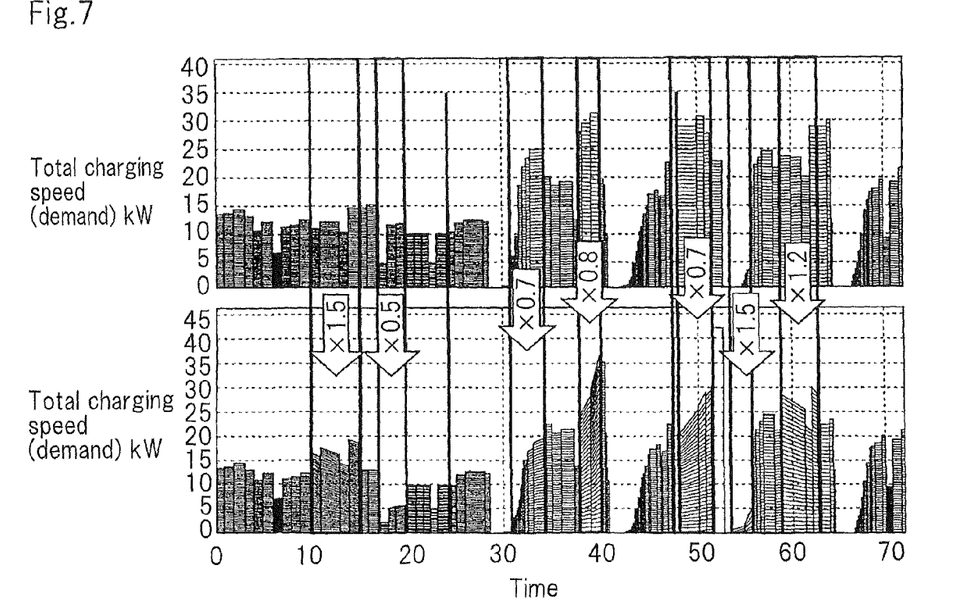
FIG. 7 shows the result of simulation in which real-time response is added to the simulation shown in FIG. 6.

FIG. 7 shows the result of simulation in which a real-time response is added to the simulation shown in FIG. 6. The upper portion shows the change in total charging demand in a case in which there is no real-time response, and the lower portion shows the change in total charging demand for a case in which real-time response is carried out.

It is assumed that requests for changes of electric power demand have occurred at the multiples (the same values as the values of real-time correction coefficient C(t)) shown in the arrows in the plurality of intervals that are enclosed by heavy frames and real-time responses are carried out for these requests, and it can be seen that demand responses of the desired multiples are realized both instantly and accurately.

To compensate for the acceleration or postponement of charging that occurs due to real-time responses, subsequent rescheduling (including re-flattened scheduling) is again carried out in real time immediately after a real-time response. Thus, it is certain that desired amount of stored charge can be realized at the departure times of EVs.

Figure 8A:
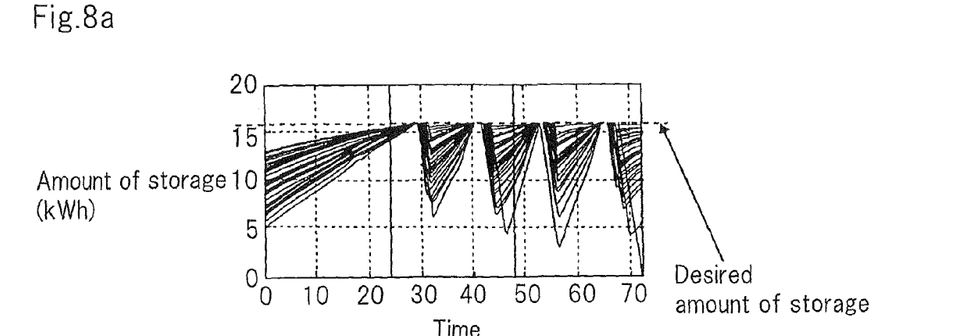
FIG. 8a shows the change over time of the amount of stored power in an EV when there is no real-time response.
Figure 8B:
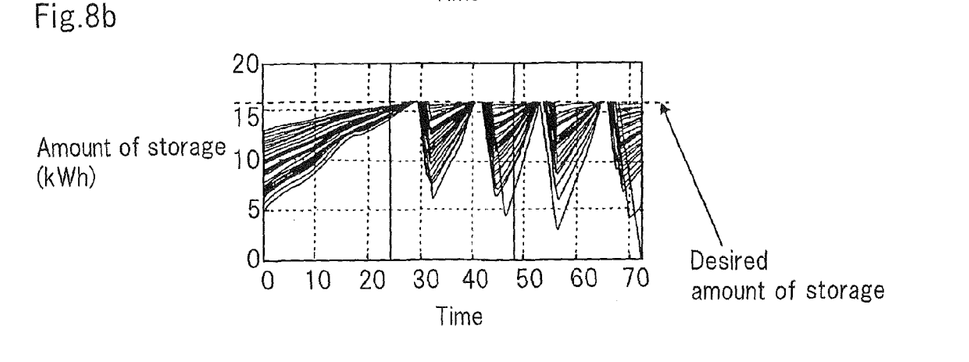
FIG. 8b shows the change over time of the amount of stored power in an EV when a real-time response is carried out.

FIG. 8a shows the change over time of the amount of stored charge in EVs when there is no real-time response. In addition, FIG. 8b shows the change over time of the amount of stored charge in EVs when real-time responses are carried out.

In the present simulation, the desired amount of stored charge at the time of EV departure is set to 16 kWh (shown by the dotted line in FIGS. 8a and 8b), and because a rescheduling step has been inserted, it can be seen that all have attained the desired amount of stored charge 16 kWh at the time of completing five charging time slots, i.e., at the time of departure of the EVs, even though real-time responses were carried out.

By carrying out the above-described processing, the present embodiment exhibits the effects described hereinbelow.

It is certain that desired amount of stored charge (full charging) can be realized at the time of departure. This is because no change occurs in the total amount of charging in the original scheduling at the times EVs connected to chargers even if there should be some type of electric power demand request, because the request demand ratio function Fn(t) that is normalized such that the average value is "1" within the possible charging time is multiplied by the flattened charging speed pn that is maintained in the permitted charging time, and, at the same time, even when a real-time response is made for a sudden request for change in demand, rescheduling is carried out immediately afterward that includes another charging speed flattening.

In addition, it is possible to circumvent the concentration of charging to limited EVs or to parking areas of these EVs (disperse or minimize load to the internal batteries of EVs or charging infrastructure) at any time point. As one reason for this, the request demand ratio function Fn(t) and the real-time correction coefficient C(t) are substantially equally multiplied for the charging speed of all EVs.

Still further, the present embodiment is also able to deal with requests of a real time adjustment means (demand change). The reason for this is that, first, the present embodiment takes as a basis charging speed (electric power demand) flattened scheduling that makes maximum utilization of the possible charging time of EVs and maximizes the degree of freedom of shifting charging times. Another point that can be raised is that, when the charging speed of each EV is determined in real time, the separate introduction of a correction coefficient independent from mid- to long-term "advance scheduling" excludes lengthy calculation processing steps up to charger control and thus improves adaptability.

In addition, scheduling can be optimized by a low-load calculation process. The reason for this is that, in just the same way as mold casting, desired charging scheduling is completed by only multiplying request demand ratio function Fn(t) and correction coefficient C(t) by flattened charging speed pn.

In addition, it is possible to ensure scalability for the number of EVs (to cope with a transitional period in which the number of EVs ranges from one to an increased number). This is because the present embodiment takes as a basis scheduling for each EV.

In addition to realizing processing in electric power aggregators 3a-3c by means of dedicated hardware in the present embodiment, a program for realizing these functions may be recorded on a recording medium that can be read in electric power aggregators 3a-3c, and electric power aggregators 3a-3c may then be caused to read and execute the program that was recorded in this recording medium. The recording medium that can be read by electric power aggregators 3a-3c refers to, for example, a movable recording medium such as an IC card, memory card, a floppy disk (registered trademark), a magneto-optical disk, a DVD, or a CD, or an HDD that is incorporated in electric power aggregators 3a-3c. The program that is recorded on this recording medium is, for example, read into control blocks, and processing similar to the processing described hereinabove is then carried out by the control of the control blocks.

This application claims the benefits of priority based on Japanese Patent Application No. 2011-047762 for which application was submitted on Mar. 4, 2011 and incorporates by citation all of the disclosures of that application.

What is claimed is:

1. A charging control system that controls charging to vehicles that run on electric power comprising:
   a flattened charging speed calculation unit that calculates a flattened charging speed for fully charging the vehicles at a fixed speed according to a permitted charging time for said vehicles and an amount of charging that is required by said vehicles;
   a charging speed calculation unit that calculates charging speed for the vehicles by multiplying a request demand ratio function that is based on change over time of electric power demand that is requested from the electric power supply side and said flattened charging speed together;
   a control unit that controls charging of the vehicles based on the charging speed that was calculated in said charging speed calculation unit; and
   a request demand ratio function calculation unit that calculates said request demand ratio function based on change over time of electric power demand requested from the electric power supply side;
wherein:
   said request demand ratio function calculation unit normalizes said request demand ratio function such that the average value within said permitted charging time is "1"; and
   said charging speed calculation unit calculates the charging speed for the vehicles by multiplying the request demand ratio function that was normalized and said flattened charging speed.

2. The charging control system according to claim 1, wherein, when a sudden request is made by said electric power supply side to change the charging time, said charging speed calculation unit calculates charging speed for the vehicles by multiplying a correction coefficient that accords with the time change by said request demand ratio function and said flattened charging speed.

* * * * *